United States Patent [19]
Mellors et al.

[11] 3,921,049
[45] Nov. 18, 1975

[54] CHARGING CIRCUIT FOR BATTERY-OPERATED DEVICES POWERED BY SOLAR CELLS

[75] Inventors: Geoffrey W. Mellors, Strongsville; Robert A. Powers, Lakewood; Glenn W. Sheffield, Strongsville, all of Ohio

[73] Assignee: Union Carbide Corporation, New York, N.Y.

[22] Filed: Sept. 25, 1973

[21] Appl. No.: 400,656

[52] U.S. Cl. .................... 320/2; 58/23 C; 320/39; 320/59
[51] Int. Cl.² .................... H02J 7/00; G04C 3/00
[58] Field of Search ............ 320/2, 5, 6, 14, 15, 23, 320/35, 39, 40, 43, 57, 59; 58/23 BA, 23 C

[56] References Cited
UNITED STATES PATENTS

| 3,148,322 | 9/1964 | Booe et al. | 320/43 |
| 3,419,779 | 12/1968 | Zehner | 320/6 |
| 3,426,263 | 2/1969 | Hennigan et al. | 320/23 |
| 3,427,797 | 2/1969 | Kimura et al. | 58/23 |
| 3,484,659 | 12/1969 | Nagai et al. | 320/2 X |
| 3,731,474 | 5/1973 | Tsuruishi | 58/23 |

Primary Examiner—J. D. Miller
Assistant Examiner—Robert J. Hickey
Attorney, Agent, or Firm—Cornelius F. O'Brien

[57] ABSTRACT

A charging circuit for battery-operated devices powered by photovoltaic cells comprising a first diode means connected in parallel to a series-connected resistor and at least one photovoltaic cell, and in parallel to a series-connected second diode means and at least one secondary battery. The terminals of the components of the circuit are connected such that the current from the photovoltaic cells is limited by the first diode means so as to prevent overcharge of the secondary battery while the second diode means is connected so as to prevent reverse current through the photovoltaic cells when the voltage of the secondary battery is higher than that of said photovoltaic cells.

9 Claims, 1 Drawing Figure

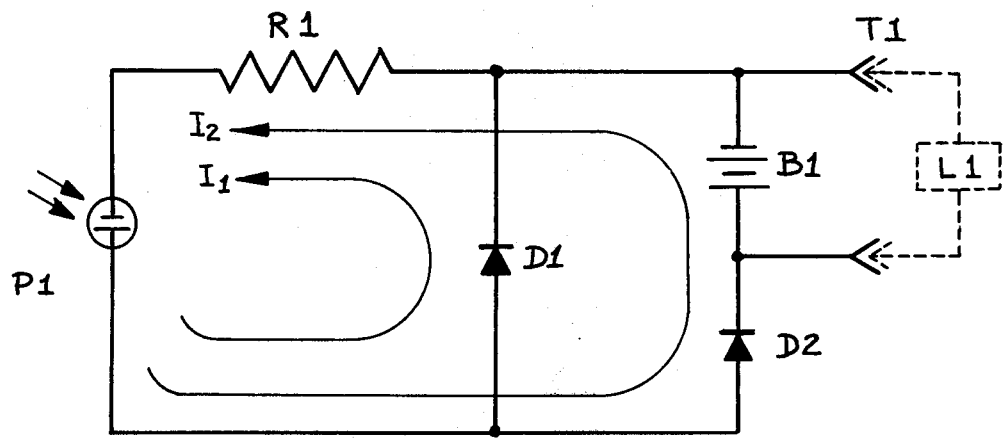

3,921,049

CHARGING CIRCUIT FOR BATTERY-OPERATED DEVICES POWERED BY SOLAR CELLS

FIELD OF THE INVENTION

This invention relates to a charging circuit for rechargeable-battery-operated devices that are powered by photovoltaic cells such as solar cells.

BACKGROUND OF THE INVENTION

The direct utilization of solar energy has been the subject of many lines of investigation. One result of this investigation has been the development of various types of photovoltaic cells which can set up electromotive forces when exposed to light, ultraviolet radiation or x-rays. These cells have found use in various commercial applications but one drawback of the cells is that they provide usable power only when exposed to some kind of radiation. Thus the cells can be used effectively only when radiant energy is available and when such radiant energy is the sunlight, then such cells can only be used during the daylight hours. A second drawback of photovoltaic cells is that they do not produce a regulated output power supply since the output power from such cells is dependent on the intensity of the radiant energy detected. Consequently, power-operated devices such as wrist watches, cameras, clocks, remote sensing devices and the like, which require a somewhat regulated power supply, cannot use photovoltaic cells as their sole power source since such cells may provide excessive voltage for the devices when the cells are exposed directly to a high radiant energy source, and then provide no voltage at all when the radiant energy is unavailable. Industry has therefore been forced to use primary or secondary (rechargeable) batteries for operating devices requiring a relatively stable supply of power. Secondary batteries of the nickel cadmium type have been found to be very effective, but the charging requirements for such batteries are somewhat critical since the charging of a nickel cadmium battery at an excessively high rate could result in excess gassing within the casing of the battery to an extent that the battery case may rupture and thereby cause damage to a component of the device in which it is used. Coupling a photovoltaic cell to a rechargeable cell for operating a device such as a wristwatch would not be effective since the power output of the photovoltaic cell is dependent upon the intensity of the radiant energy detected and thereby could generate an excessively high charging current for the rechargeable cell when and if it was exposed to a high radiant energy source.

Accordingly, an object of the present invention is to provide circuit means for preventing the overcharging of one or more rechargeable cells by one or more photovoltaic cells.

Another object of the invention is to provide circuit means for bypassing a portion of the current generated by one or more photovoltaic cells when said current generated by the cells is greater than that required for safely charging one or more rechargeable cells coupled to said photovoltaic cells.

Another object of the invention is to utilize rechargeable highly conductive solid electrolyte cells coupled to photovoltaic cells via overcharge preventive circuit means for operating relatively low power devices.

Another object of the invention is to provide diode means for preventing reverse current flow through one or more photovoltaic cells from one or more rechargeable cells coupled thereto when the voltage of said rechargeable cells is higher than the voltage of the photovoltaic cells.

SUMMARY OF THE INVENTION

The invention relates to a charging circuit for battery operated devices powered by a photovoltaic battery comprising a photovoltaic battery having positive and negative terminals; resistive means connected in series to said photovoltaic battery; first diode means connected in parallel across said series-connected photovoltaic battery and resistive means so as to provide a first conductive circuit loop for said photovoltaic battery; second diode means connected in series to a rechargeable battery having positive and negative terminals; said rechargeable battery and second diode means connected in parallel across both the first diode means and the series-connected photovoltaic battery and resistive means; said photovoltaic battery and resistive means connected in terminal relationships with the rechargeable battery and second diode means so as to provide a second conductive circuit loop through which the photovoltaic battery will charge said rechargeable battery while said second diode means will prevent reverse current flow through said photovoltaic battery when the voltage of said rechargeable battery exceeds the voltage of said photovoltaic battery; said first diode means providing in said first conductive circuit loop a path so as to prevent excessively high current flow from said photovoltaic battery through said rechargeable battery thereby preventing overcharge of said rechargeable battery; and output terminals connected across said rechargeable battery and adapted for coupling to a battery-powered device.

As used herein, battery shall mean one or more cells.

As used herein, a photovoltaic battery shall mean a battery that provides a source of electric current under the influence of light or other radiation. An example of a photovoltaic battery is a solar battery that utilizes the light of the sun for generating an electric current, e.g., CdS, Si, or Ge type solar batteries.

Diode means as used herein is at least one two-electrode device having an anode and a cathode and which has marked unidirectional characteristics. Crystal and semiconducting diodes, both silicon and germanium, are preferable for this invention although other type diodes may be used.

Rechargeable batteries for use in this invention can be the conventional nickel cadmium type rechargeable batteries. However, due to the relatively low charging current supplied by most commercial photovoltaic batteries, solid electrolyte rechargeable batteries would be preferable. U.S. Pat. No. 3,582,291 to G. W. Mellors discloses solid ionic conductors which are admirably suited for use in the rechargeable battery in accordance with this invention. The solid ionic conductors disclosed in the patent are the compositions which conform to the general formula MCN—4AgI or modifications thereof wherein M is potassium, rubidium, cesium, or mixtures thereof. The MCN component of the formula may be, therefore, potassium cyanide, rubidium cyanide or cesium cyanide alone or in any combination so long as the mole ratio of total alkali cyanide to silver iodide is 1:4. Illustrative of suitable compositions are:

KCN—4AgI, RbCN—4AgI, CsCN—4AgI, $K_{1/2}Rb_{1/2}CN$—4AgI and $K_{1/3}Rb_{1/3}Cs_{1/3}CN$—4AgI.

U.S. Pat. No. 3,723,185 to G. W. Mellors describes other ionically conducting compositions operative at room temperature which conform to the general formula AgI—MCN—AgCN or modifications thereof wherein M is potassium, rubidium, cesium or mixtures thereof.

A particular cell system utilizing these solid electrolytes is disclosed in U.S. Pat. No. 3,653,968 to D. V. Louzos and employs a silver or copper anode and an iodine-containing cathode. Illustrative of suitable cathodes are the charge transfer complexes such as 2 perylene·$3I_2$.

Modifications of the above family of electrolytes which are also useful in accordance with this invention are disclosed in pending applications U.S. Ser. No. 210,143 by van Lier et al. filed Dec. 20, 1971, and Ser. No. 233,802 by W. G. Darland filed Mar. 10, 1972. The former discloses solid ionic conductors conforming to the general formulas $MAg(CN)_2$—MI—AgI wherein M may be potassium or rubidium or mixtures thereof, the composition containing 20 to 95% (molar percentage) AgI, the remainder being MI and $MAg(CN)_2$ wherein the molar proportion of MI to $MAg(CN)_2$ is greater than 1 to 1. In patent application Ser. No. 233,802 the solid ionic conductors which are disclosed are of the same general formula as those in U.S. Ser. No. 210,143 by van Lier et al. except that about 10 to 40 percent by weight of AgI in finely divided form has been added to improve the moldability of the composition. In U.S. Pat. No. 3,443,997 to Argue et al. another group of desirable solid electrolytes for rechargeable batteries are disclosed which conform to the general formula $MAg_4I_5$.

Since solid batteries require but low currents for recharge, they are ideally suited for use in conjunction with solar cells because of the relatively low current produced by the latter. Also suitable for use with the charging circuit of this invention are secondary lead-acid cells and in some applications alkaline-zinc batteries, provided the latter are not deeply discharged.

The sole drawing shows a schematic circuit diagram of an embodiment of the present invention wherein a photovoltaic battery is coupled via overcharge preventive means to a rechargeable battery to operate a battery-powered device. Specifically, the drawing shows a photovoltaic battery $P_1$ connected in series to resistor $R_1$ and together they are connected in parallel across a voltage-limiting diode means $D_1$. The diode means $D_1$ is forward-biased by photovoltaic battery $P_1$, thereby providing a first conductive current circuit loop $I_1$. Diode means $D_2$ is shown connected in series to rechargeable battery $B_1$ and together they are coupled in parallel across diode means $D_1$ and series-connected resistor $R_1$ and photovoltaic battery $P_1$. Rechargeable battery $B_1$ and photovoltaic battery $P_1$ are connected such that a second conductive current circuit loop $I_2$ is provided whereby the positive terminal of $P_1$ is coupled via diode means $D_2$ to the positive terminal of rechargeable battery $B_1$, and the negative terminal of photovoltaic battery $P_1$ is coupled via resistor $R_1$ to the negative terminal of rechargeable battery $B_1$. Diode means $D_2$ is forward-biased in current circuit loop $I_2$ when the photovoltaic battery is conducting and charging rechargeable battery $B_1$ and it is reverse-biased when the voltage of the rechargeable battery is higher than the voltage of the photovoltaic battery. Under this circuit arrangement, reverse current flow through the photovoltaic battery from the rechargeable battery is prevented. Terminals $T_1$ and $T_2$ are shown connected across rechargeable battery $B_1$ and are adapted for coupling to a battery-powered load $L_1$ such as a wristwatch, camera, clock, remote sensing devices and the like.

As evident from the drawing, diode means $D_1$ is selected such that the voltage across diode means $D_1$ is limited so that the current through battery $B_1$ will likewise be limited and consequently not exceed a desired maximum value. The particular limiting voltage to be provided by diode means $D_1$ is dependent upon the charging characteristics of battery $B_1$, and the sensitivity and effectiveness of photovoltaic battery $P_1$. Likewise, resistor $R_1$ is selected so that it can dissipate the excess current generated by photovoltaic battery $P_1$ when said battery $P_1$ is exposed to a high intensity light or radiation source. Again the selection of resistor $R_1$ will depend on the particular photovoltaic battery selected along with the characteristic of the rechargeable battery. The following example will serve to illustrate one embodiment of this invention. A circuit similar to that shown in the drawing was coupled to a "Timex" (registered trade name) electric watch No. 94511 which required a battery that would provide a current pulse of 427 microamperes for 5.2 milliseconds followed by a quiescent period of 171 milliseconds, thereby providing an average current of about 12 microamperes. A 2-cell rechargeable solid ionically conducting battery utilizing an $Ag/KCN$—4AgI/2perylene·$3I_2$ system was used as battery $B_1$. These cells, having a 4-milliampere hour capacity, could not be charged at a voltage higher than about 0.67 volt per cell because damage to the battery could occur. Photovoltaic battery $P_1$ consisted of six silicon solar cells having a voltage output that varied from 0 to 3.0 volts, depending on the intensity of the illumination detected. $R_1$ in the circuit was a 7.5 K ohms resistor, diode means $D_1$ consisted of three series-connected silicon diodes (1N4003), each having a 0.600-volt threshold voltage which provided a 1.8-volt level when said diodes were conducting, and diode means $D_2$ was a germanium blocking diode (1N99) having a voltage of about 0.45 to 0.50 volt. Thus, when using the above-identified components in a circuit as shown in the drawing, and having the solar cells mounted on the wristband, the charging voltage measured across the rechargeable battery measured 1.30 volts in normal light and 1.35 volts in bright light.

To simulate the charging and discharging periods that a solar-powered battery-operated wristwatch would encounter under normal use conditions, a light source comprising a 75-watt lamp connected in series with a Variac transformer to a 110 V ac supply was focused upon the solar cells disposed in the wristband of the subject wristwatch for a specific time period of 12 hours, and then said light was extinguished for a specific time period of 12 hours, thus simulating the day and night periods. This type of simulated testing was continued for three months after which the components of the circuit were examined and found to be in good working condition. During this testing period the rechargeable cells provided a total discharge capacity of 23,610 $\mu$Ah through the watch while the solar cells supplied to said rechargeable cells a total charge capacity of 22,940 $\mu$Ah. Consequently, since the rechargeable cells were rated at a 4-milliampere hour capacity, said cells effectively were fully recharged more than five times. Thus, the use of the charging circuit of this invention is admirably suited for battery-operated wristwatches.

As will be apparent to one skilled in the art, the illustrative example is only set forth as one embodiment of the invention and it is therefore possible to produce other embodiments and modifications of the invention without departing from the scope or spirit of the appended claims.

What is claimed is:

1. A charging circuit for battery-operated devices powered by a photovoltaic battery comprising a photovoltaic battery having positive and negative terminals; resistive means connected in series to said photovoltaic battery; first diode means connected in parallel across said series-connected photovoltaic battery and resistive means so as to provide a first conductive circuit loop for said photovoltaic battery; second diode means connected in series to a rechargeable battery having positive and negative terminals; said rechargeable battery and second diode means connected in parallel across both the first diode means and the series-connected photovoltaic battery and resistive means; said photovoltaic battery and resistive means connected in terminal relationship with the rechargeable battery and second diode means so as to provide a second conductive circuit loop in which the photovoltaic battery will charge said rechargeable battery while said second diode means will prevent reverse current flow through said photovoltaic battery when the voltage of said rechargeable battery exceeds the voltage of said photovoltaic battery; said first diode means providing in said first conductive circuit loop a path so as to prevent excessively high current flow from said photovoltaic battery through said rechargeable battery; and output terminals connected across said rechargeable battery and adapted for coupling to a battery-powered device.

2. The charging circuit of claim 1 wherein said photovoltaic battery is a solar battery.

3. The charging circuit of claim 1 wherein said rechargeable battery utilizes a solid ionically conducting electrolyte system.

4. The charging circuit of claim 1 wherein said first diode means are silicon.

5. The charging circuit of claim 1 wherein said second diode means are germanium.

6. The charging circuit of claim 1 for use in a battery-operated wristwatch wherein said photovoltaic battery is a solar battery and wherein said rechargeable battery utilizes solid ionically conducting electrolyte system.

7. The charging circuit of claim 6 wherein said first diode means are silicon diode means and wherein said second diode means are germanium diode means.

8. The charging circuit of claim 6 wherein said first diode means are three series-connected silicon diodes and wherein said second diode means is a germanium diode.

9. The charging circuit of claim 8 wherein said solar battery is a silicon solar battery.

* * * * *